US012793415B2

(12) United States Patent
Rozner et al.

(10) Patent No.: US 12,793,415 B2
(45) Date of Patent: Nov. 10, 2026

(54) METHODS AND SYSTEMS FOR OCCUPANCY DETECTION USING A VIDEO FEED

(71) Applicant: Tyco Fire & Security GmbH, Neuhausen am Rheinfall (CH)

(72) Inventors: Amit Rozner, Yehud (IL); Yohay Falik, Petah Tiqwa (IL); Calanit Dotan, Tel Aviv (IL)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 385 days.

(21) Appl. No.: 18/451,420

(22) Filed: Aug. 17, 2023

(65) Prior Publication Data

US 2025/0061708 A1 Feb. 20, 2025

(51) Int. Cl.
*G06V 20/40* (2022.01)
*G05B 13/02* (2006.01)
(Continued)

(52) U.S. Cl.
CPC ......... *G06V 20/41* (2022.01); *G05B 13/0265* (2013.01); *G06T 7/70* (2017.01);
(Continued)

(58) Field of Classification Search
CPC ........ G06V 20/41; G06V 10/70; G06V 20/52; G06V 40/10; G06T 7/70; G06T 2200/24; G06T 2207/10016; G06T 2207/20092; G06T 2207/30196; G06T 2207/30232; G05B 13/0265
See application file for complete search history.

(56) References Cited

U.S. PATENT DOCUMENTS 10,742,940 B2 * 8/2020 Ryan .................... G06V 10/762
11,044,445 B2 * 6/2021 Ryan ....................... G06F 18/23
(Continued)

FOREIGN PATENT DOCUMENTS

CN 112416038 A 2/2021
CN 113792674 A 12/2021
(Continued)

OTHER PUBLICATIONS

S. Deepaisarn et al., "Camera-Based Log System for Human Physical Distance Tracking in Classroom," 2022 Asia-Pacific Signal and Information Processing Association Annual Summit and Conference (APSICA ASC), Chiang Mai, Thailand, 2022, pp. 1977-1983, doi: 10.23919/APSIPAASC55919.2022.9980055. (Year: 2022).*
(Continued)

*Primary Examiner* — Delomia L Gilliard
(74) *Attorney, Agent, or Firm* — ArentFox Schiff LLP

(57) ABSTRACT

Systems and methods are disclosed for indicating occupancy of a point of interest in a room. A video feed from a camera located in the room can be received, and a person in the video feed can be detected by using an artificial intelligence (AI) model. A location of the person on a floor plan of the room can be identified based on a video feed location of the person detected in the video feed, and where the location of the person on the floor plan is at the point of interest for at least a threshold period of time, the point of interest can be indicated as being occupied.

20 Claims, 5 Drawing Sheets

(51) Int. Cl.

| | |
|---|---|
| ***G06T 7/70*** | (2017.01) |
| ***G06V 10/70*** | (2022.01) |
| ***G06V 20/52*** | (2022.01) |
| ***G06V 40/10*** | (2022.01) |

(52) U.S. Cl.

CPC .............. *G06V 10/70* (2022.01); *G06V 20/52* (2022.01); *G06V 40/10* (2022.01); *G06T 2200/24* (2013.01); *G06T 2207/10016* (2013.01); *G06T 2207/20092* (2013.01); *G06T 2207/30196* (2013.01); *G06T 2207/30232* (2013.01)

(56) References Cited

U.S. PATENT DOCUMENTS

| | | | | |
|---|---|---|---|---|
| 11,893,084 | B2 * | 2/2024 | Kulandai Samy | G06V 20/41 |
| 2016/0092056 | A1 * | 3/2016 | Yang | G06V 40/173<br>348/143 |
| 2017/0286761 | A1 | 10/2017 | Zackay et al. | |
| 2018/0144495 | A1 | 5/2018 | Roth et al. | |
| 2018/0324393 | A1 | 11/2018 | Ryan et al. | |
| 2020/0134875 | A1 * | 4/2020 | Yi | G06F 18/28 |
| 2020/0228759 | A1 | 7/2020 | Ryan et al. | |
| 2021/0117693 | A1 * | 4/2021 | Martin | G06T 7/246 |
| 2023/0140505 | A1 * | 5/2023 | Amato | G06F 18/21<br>382/103 |
| 2023/0215178 | A1 | 7/2023 | Ryan et al. | |
| 2025/0061708 | A1 * | 2/2025 | Rozner | G05B 13/0265 |
| 2025/0155962 | A1 * | 5/2025 | Doidge-Harrison | G06T 11/00 |

FOREIGN PATENT DOCUMENTS

| | | | |
|---|---|---|---|
| CN | 115841698 | A | 3/2023 |
| EP | 2966371 | A1 | 1/2016 |
| GB | 2575210 | A | 1/2020 |
| IN | 201811049778 | A | 7/2020 |
| JP | 2018181221 | A | 11/2018 |
| WO | 2017072158 | A1 | 5/2017 |
| WO | 2018087762 | A1 | 5/2018 |
| WO | 2018204332 | A1 | 11/2018 |

OTHER PUBLICATIONS

Extended European Search Report issued Jan. 14, 2025 for European Patent Application No. 24194893.4.

Tien, et al., "A Computer Vision-Based Occupancy and Equipment Usage Detection Approach for Reducing Building Energy Demand", 2021, Energies, vol. 14, No. 1, XP 093231760, 28 pages.

* cited by examiner

METHODS AND SYSTEMS FOR OCCUPANCY DETECTION USING A VIDEO FEED

BACKGROUND

The present disclosure relates to performing occupancy detection in a room, and more particularly to identifying occupancy of points of interest in the room.

Systems exist for detecting occupancy in rooms of buildings using motion sensors or video to detect movement in the room. When the room is occupied, various automated systems can be controlled, such as heating, ventilation, and air conditioning (HVAC) systems, alarm systems, light controlling systems, etc. Video surveillance systems also exist that include cameras for capturing video feeds of a room for review by security personnel to detect activity in the room.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, a method for indicating occupancy of a point of interest in a room is provided that includes receiving a video feed from a camera located in the room, detecting, using an artificial intelligence (AI) model, a person in the video feed, identifying a location of the person on a floor plan of the room based on a video feed location of the person detected in the video feed, and where the location of the person on the floor plan is at the point of interest for at least a threshold period of time, indicating the point of interest as being occupied.

In another aspect, an apparatus including one or more memories configured to store instructions, and one or more processors communicatively coupled with the one or more memories is provided. The one or more processors are configured to receive a video feed from a camera located in the room, detect, using an AI model, a person in the video feed, identify a location of the person on a floor plan of the room based on a video feed location of the person detected in the video feed, and where the location of the person on the floor plan is at the point of interest for at least a threshold period of time, indicate the point of interest as being occupied.

In another aspect, one or more computer-readable media storing instructions, executable by one or more processors, for indicating occupancy of a point of interest in a room, are provided. The instructions include instructions for receiving a video feed from a camera located in the room, detecting, using an AI model, a person in the video feed, identifying a location of the person on a floor plan of the room based on a video feed location of the person detected in the video feed, and where the location of the person on the floor plan is at the point of interest for at least a threshold period of time, indicating the point of interest as being occupied.

In another aspect, an occupancy sensing device is provided that includes various hardware, software, or other components for detecting occupancy status of one or more points of interest in a room using one or more methods described herein. In another aspects, an occupancy sensing device is provided that includes means for detecting occupancy status of one or more points of interest in a room using one or more methods described herein. In another aspect, a computer-readable medium is provided herein that stores computer executable instructions for detecting occupancy status of one or more points of interest in a room using one or more methods described herein.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
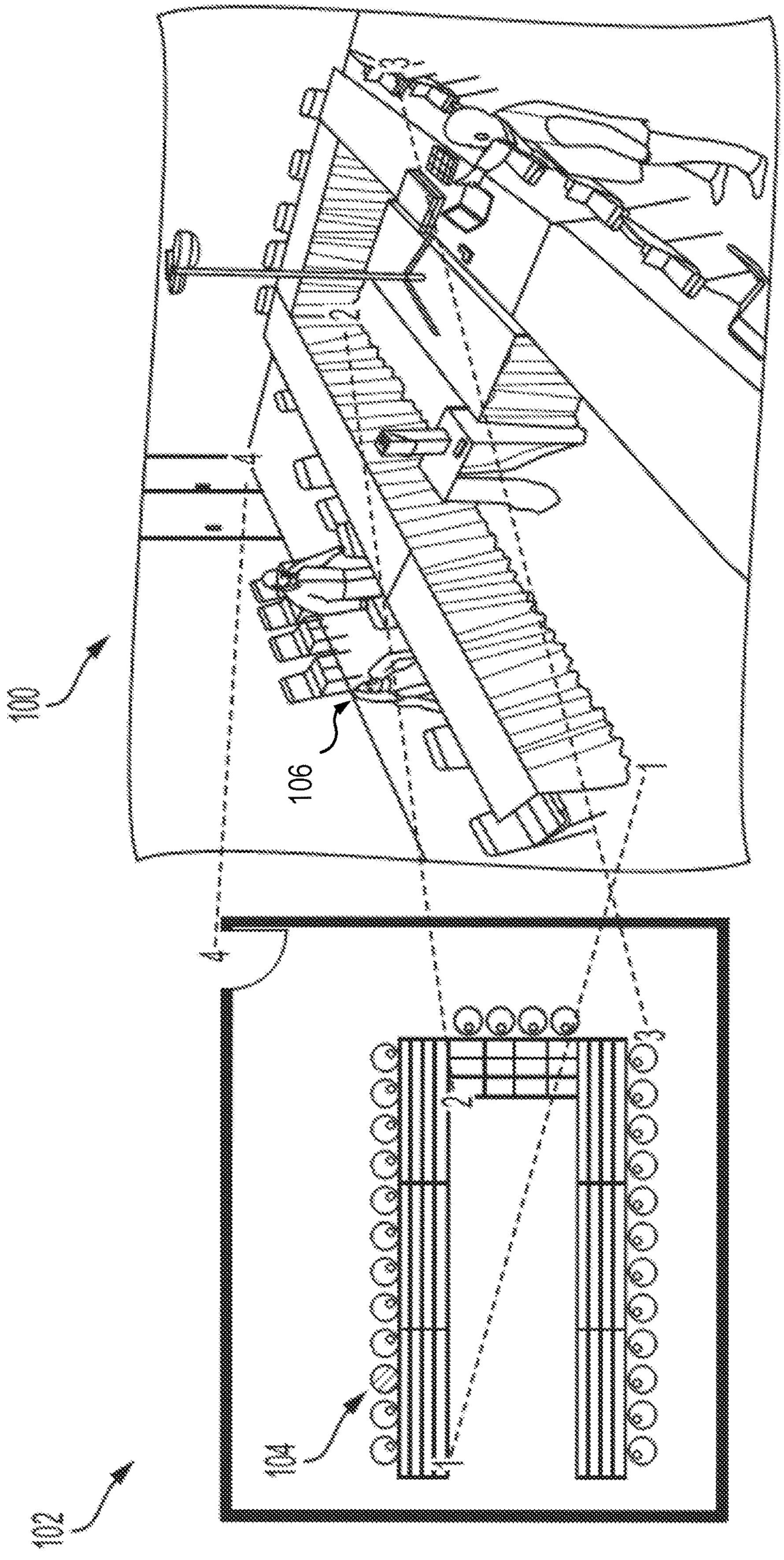
FIG. 1 illustrates an example of a video feed from a security camera in a room and a floor plan of the room, according to implementations of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Current occupancy detection systems only detect general occupancy metrics of a room, such as whether the room is occupied, or how many people are occupying the room. There is a need, however, to identify whether points of interest in a room are being occupied, such as desks, seats, or other occupiable portions within the room. For example, some rooms (e.g., in an office) have sets of desks or seats available for use by employees or customers. The employees or customers may benefit from knowing which or how many desks or seats are available for use at a given point in time. In one example, some business provide office spaces for use or rent as hot desking areas that can be reserved (e.g., through a website). Hot desking is a flexible seating arrangement that allows employees and visitors to book and use a desk for anytime during the day. In addition, location information can be used to optimize the building energy consumption (e.g., by allowing control of energy systems (e.g., HVAC, lighting, chillers, etc.) based on detected occupancy of the points of interest within the room.

The present disclosure addresses one or more shortcomings of occupancy detection systems by allow for detecting occupancy of one or more points of interest within a room, such as a desk, a seat, etc. For example, the occupancy detection system can detect occupancy of the one or more points of interest as identified on a floor map of the room. The occupancy detection system can operate in conjunction with one or more cameras, such as a security camera(s) that may already exist in the room, to detect occupancy based on a video feed from the one or more cameras. For example, one or more persons can be detected in the video feed (e.g., using artificial intelligence (AI)), and a location of the one or more persons in the video can also be detected. The location of the one or more persons in the video can be translated or mapped to a location on the floor plan. Based on the location on the floor plan, occupancy of one or more points of interest on the floor plan can be identified. In an example, the occupancy of the one or more points of interest can be further identified based on detecting the location of the one or more persons at the one or more points of interest for at least a threshold period of time.

In an example, a calibration can be performed between the locations in the video feed and the locations on the floor map. For example, the calibration can include associating multiple points on the video feed with corresponding points on the floor map. In an example, a user interface (UI) can be provided with a representation of the video feed and a representation of the floor map, and the UI can allow a user to select (e.g., by touching a touchscreen, mouse click, etc.) or otherwise indicate the points on the video feed (e.g., on an image or video captured in the video feed by the camera) and the corresponding points on the floor plan. The mapping between points can be used to map or translate video feed locations to floor plan locations.

In accordance with examples described herein, detecting occupancy of specific points of interest within a room, in this regard, can allow for various advantages, such as indicating the occupancy for hot desking applications for providing real-time information of desks that are available or occupied. In other examples, detecting occupancy of specific points of interest within a room, as described herein, can allow for controlling automated systems in a building (e.g., HVAC, lighting, etc.) for conserving energy consumption, tracking occupancy for statistical analysis, etc.

Turning now to the figures, example aspects are depicted with reference to one or more modules or components described herein, where modules or components in dashed lines may be optional.

Referring to FIG. 1, an example of a video feed 100 from a security camera in a room and a floor plan 102 of the room are shown, in accordance with aspects described herein. The floor plan 102 of the room is a two-dimensional top-down representation of the room showing various tables and seats (e.g., chairs), which are also represented in the three-dimensional video feed 100 from the camera. In accordance with aspects described herein, a calibration process can be performed to calibrate locations in the video feed 100 with corresponding locations on the floor plan 102. This is shown by the numerals 1, 2, 3, 4 in the video feed 100 and the floor plan 102.

In one example, a user interface (UI) can display the video feed 100 of the room and the floor plan 102 of the room. For example, the video feed 100 can be received from a camera situated in the room, such as a security camera or other camera at a position to facilitate detecting persons in the room as occupying one or more points of interest, such as one or more seats at one or more tables. In an example, the floor plan 102 can be obtained from a building management system or other source, as corresponding to the room within which the camera is situated. In an example, the UI can allow a user to associate points on the video feed 100 with points on the floor plan 102, such as by touching or clicking the sets of points. For example, the user can select a number of points (e.g., 4 or more) where selecting more points can allow for more precise location translation. In any case, the point pairs indicated between the video feed 100 and floor plan 102 can be used to translate a video feed location to a floor plan location, in accordance with aspects described herein.

As described in further detail below, a person can be detected in the video feed 100 (e.g., by using AI modeling). In some examples, it can be determined whether the person is occupying a point of interest, such as a seat, based on identifying the person and/or identifying the person at a location corresponding to the point of interest for a threshold period of time. For example, the person 106 sitting at the table in video feed 100 can be identified as located at point of interest 104 on the floor plan for a period of time. In one example, when the person 106 is identified as located at the point of interest 104 for the period of time, the point of interest 104 can be indicated as occupied (e.g., by the shaded indicator over the point of interest 104 or other notification or reporting). In one example, each point of interest can have an indicator indicating whether the status is occupied or not (e.g., a red indicator for occupied or a green indicator for vacant).

In an example, the occupancy status can be tracked for each point of interest in near real time, so if or when the person sitting at seat 104 stands and/or leaves the area (e.g., for a threshold period of time), the occupancy status indicator can change to show the point of interest as vacant. In one example, multiple persons can be detected in a given video feed, such as by using the AI model to detect the persons, and can be associated with a location and a time during which the persons are detected as a location (e.g., if the location corresponds to a point of interest). Persons determined to be at a location of a point of interest for at least a threshold period of time can cause change in occupancy status for the point of interest, as described herein.

Figure 2:
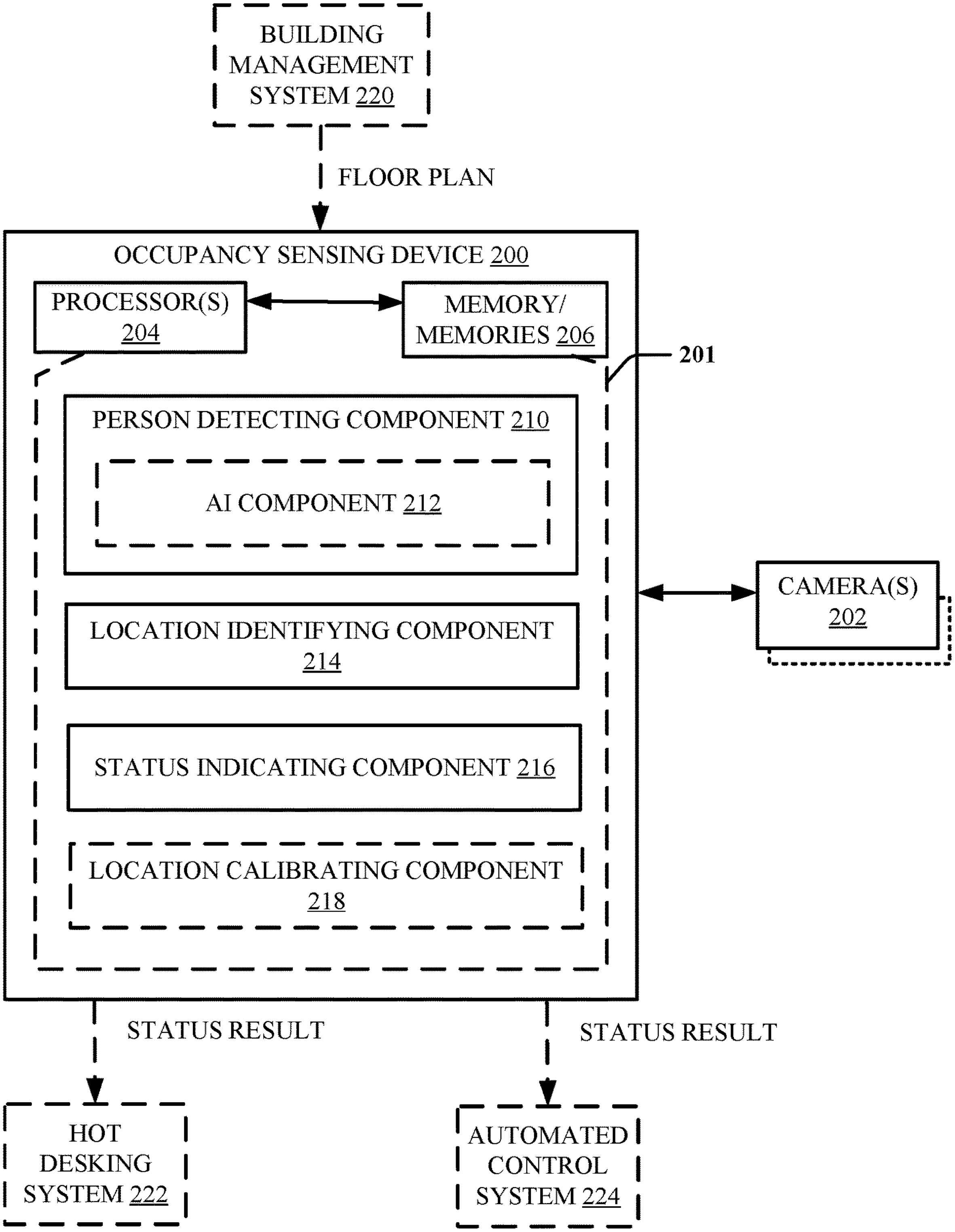
FIG. 2 is a schematic diagram of an example of an occupancy sensing device and/or related components for sensing occupancy at one or more points of interest in a room, according to implementations of the present disclosure.

FIG. 2 is a schematic diagram of an example of an occupancy sensing device 200 and/or related components for sensing occupancy at one or more points of interest in a room, in accordance with aspects described herein. In an example, occupancy sensing device 200 can receive video feed from one or more cameras 202 for sensing occupancy of certain points of interest in a room, as described herein. For example, the cameras 202 can include red, green, blue (RGB) cameras, infrared cameras, or other cameras installed in a room of a building. In one example, the camera(s) 202 can include security cameras. The camera(s) 202 can be installed at a height from the floor that is sufficient for detecting persons in the room.

In an example, occupancy sensing device 200 can include or can otherwise be coupled with one or more processors 204 and/or a memory or memories 206, where the processor(s) 204 and/or memory/memories 206 can be configured to execute or store instructions or other parameters related to detecting occupancy in one or more points of interest in a room, as described herein. For example, processor(s) 204 and memory/memories 206 may be separate components communicatively coupled by a bus (e.g., on a motherboard or other portion of a computing device, on an integrated circuit, such as a system on a chip (SoC), etc.), components integrated within one another (e.g., processor(s) 204 can include the memory/memories 206 as an on-board component 201), and/or the like. In another example, processor(s) 204 can include multiple processors on different distributed computing resources (e.g., in cloud-based computing architecture). In an example, memory/memories 206 can include multiple memories on different distributed computing resources (e.g., in cloud-based computing architecture). Memory/memories 206 may store instructions, parameters, data structures, etc., for use/execution by processor(s) 204 to perform functions described herein.

In an example, occupancy sensing device 200 can optionally include one or more of a person detecting component 210 for detecting one or more persons in a video feed, an AI component 212 for detecting the one or more persons using an AI model, a location identifying component 214 for identifying a location of the one or more persons in the room based on the video feed locations of the identified person(s), a status indicating component 216 for indicating an occupancy status for one or more points of interest in the room (e.g., on a floor plan or other representation of the room), and/or a location calibrating component 218 for calibrating locations from the video feed with locations of a floor plan or other representation of the room to facilitate translating video feed locations to floor plan locations.

In an example, occupancy sensing device 200 can communicate with other devices or systems, such as camera(s) 202, a building management system 220 that manages building security, alarms, surveillance, etc., a hot desking system 222 that can provide near real time indications of occupancy of desks in a room, an automated control system 224 that controls one or more automated machines or components of the building (e.g., HVAC, light controls, etc.), and/or the like. For example, occupancy sensing device 200 can communicate with the various systems over a network connection (not shown) or substantially any connection that communicatively couples the occupancy sensing device 200 to the systems. In one example, occupancy sensing device 200 can obtain, from the building management system 220, a floor plan of a room that has the camera installed. In another example, occupancy sensing device 200 can communicate with the hot desking system 222 to provide an indication of occupancy status of one or more desks in the room. In yet another example, occupancy sensing device 200 can communicate with the automated control system 224 to control one or more building components, such as HVAC, lighting, etc., for the room based on occupancy status.

In an example, occupancy sensing device 200 can receive video feed from one or more cameras 202 situated in a room, and person detecting component 210 can detect one or more persons in the video feed. For example, person detecting component 210 can utilize the AI component 212 to detect the one or more persons. In one example, AI component 212 can draw a bounding box around the one or more persons based on pixel values that may be indicative an object in the room, motion detected via pixel values in different video frames of the video feed, etc. For example, AI component 212 can identify the object in the bounding box as a person based at least in part on comparing the image in the bounding box to images of people. In one example, AI component 212 can use an object detector based on a machine learning (ML) model trained to detect certain objects, such as persons, in an image. In other examples, AI component 212 can bypass the GAN (e.g., for a different neural network used), or can bypass one of the generator or discriminator (e.g., assuming they are well trained) in detecting bounding boxes that correspond to persons in the video feed.

In an example, location identifying component 214 can identify a location of each of the persons detected in the video feed, and can translate the video feed location to a location on a floor plan, as described. For example, occupancy sensing device 200 can receive a floor plan (e.g., from a building management system 220) and/or location calibrating component 218 can perform a calibration process to associate points on the video feed (e.g., points in the room captured on the video feed) with points on the floor plan. With enough associated points, location identifying component 214 can translate, map, convert, or otherwise calculate a floor map location for a given video feed location. In an example, status indicating component 216 can indicate occupancy status for a point of interest corresponding to the identified location, which may change based on a period of time for which the person is detected at the identified location. Occupancy sensing device 200, for example, can output the status result for one or more points of interest to other systems, such as the hot desking system 222, automated control system 224, etc.

Figure 3:
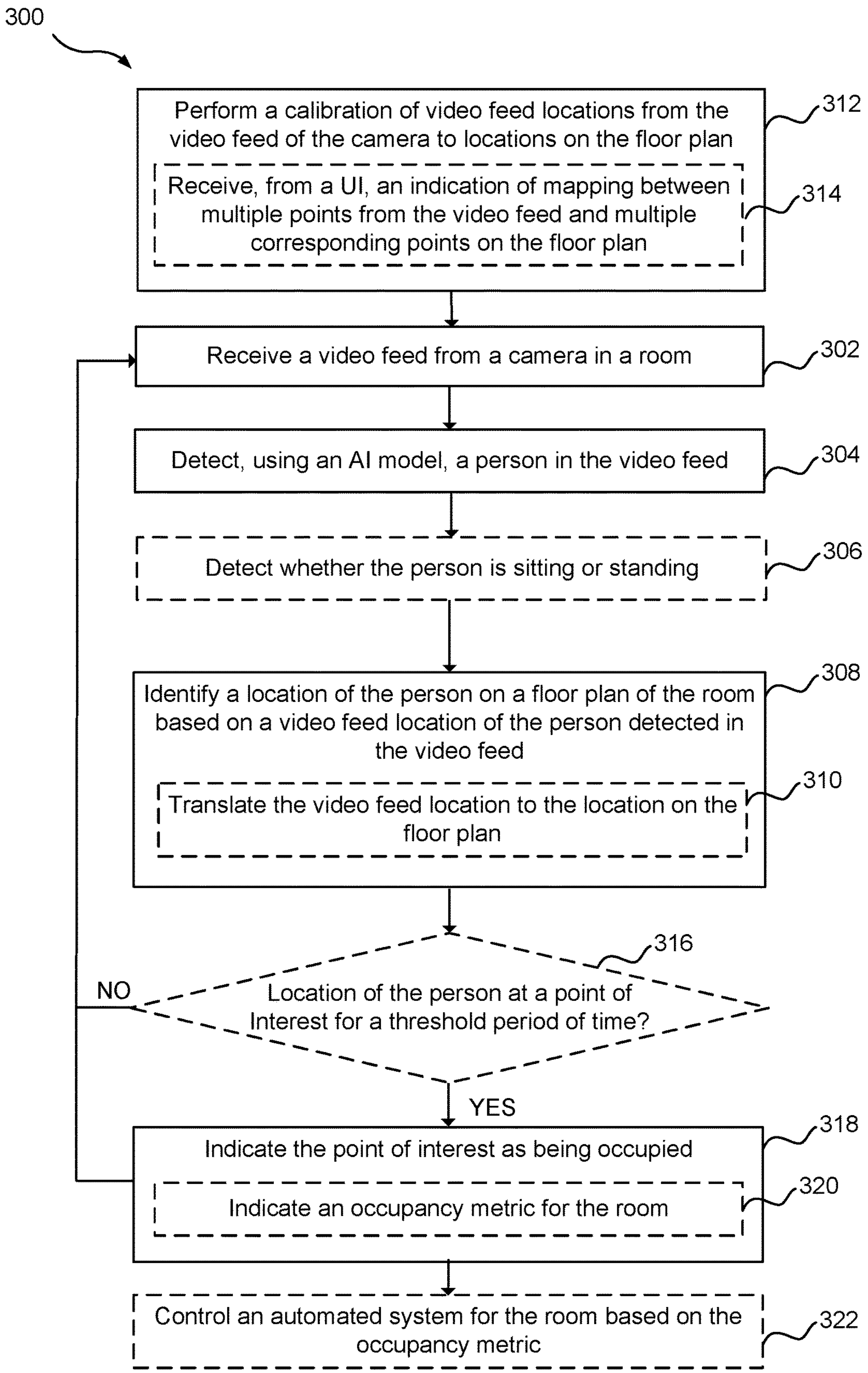
FIG. 3 is a flowchart of an example of a method for indicating occupancy status for one or more points of interest in a room, according to implementations of the present disclosure.

Referring to FIG. 3, an example of a method 300 for indicating occupancy status for one or more points of interest in a room is depicted. The operations of the method 300 may be performed by one or more modules or components of the occupancy sensing device 200, as described herein.

At 302, the method 300 may include receiving a video feed from a camera in a room. In an example, occupancy sensing system 200, e.g., in conjunction with the one or more processors 204, memory/memories 206, etc., can receive the video feed from the camera (e.g., one or more cameras 202) in the room. The cameras 202 can include one or more security cameras or other cameras situated in the room, and may be installed at a height that can capture an entire body of a person at one or more locations in the room. In one example, multiple cameras 202 can be provided that capture multiple angles of view in the room, such that the multiple cameras 202 can be situated at a height sufficient to capture an entire body of a person at the one or more locations in the room from various angles.

In other examples, the cameras 202 may not be able to capture an entire body of the person at certain locations in the room. In this case, for example, assumptions can be made as to the height of the person captured, whether the person is sitting or standing, etc.

At 304, the method 300 may include detecting, using an AI model, a person in the video feed. In an example, person detecting component 210, e.g., in conjunction with the one or more processors 204, memory/memories 206, AI component 212, etc., can detect, using the AI model, the person in the video feed. For example, person detecting component 210 can draw or determine a bounding box around a detected person based on AI component 212 comparing portions of an image of the video feed to images of persons in the AI model. In an example, person detecting component 210 can detect a face of the person (e.g., based on the portion of the image of the video feed to images of faces) and can detect other body parts, such as trunk, arms, legs, hands, feet, etc. Person detecting component 210 can draw the bounding box around the person based on the multiple identified body parts.

At 306, the method 300 may optionally include detecting whether the person is sitting or standing. In an example, person detecting component 210, e.g., in conjunction with the one or more processors 204, memory/memories 206, etc., can detect whether the person is sitting or standing. For example, person detecting component 210 can make a height assumption for the person (e.g., as being of average height for a person). In this example, person detecting component 210 can determine a size (e.g., a height) of the bounding box drawn around the person, and can determine whether the height of the bounding box is indicative of a height of a seated person or a standing person. For example, person detecting component 210 can detect the bounding box height proportional to the width. In another example, person detecting component 210 can detect the bounding box height and a portion of the body captured in the bounding box, and can then infer a height based on the portion of the body captured in the bounding box. This may be useful in determining occupancy status for a point of interest that includes a desk with a seat or chair. For example, where the detected bounding box size is less than a threshold, this may indicate the person is seated.

At 308, the method 300 may include identifying a location of the person on a floor plan of the room based on a video feed location of the person detected in the video feed. In an example, location identifying component 214, e.g., in conjunction with the one or more processors 204, memory/memories 206, etc., can identify the location of the person on the floor plan of the room based on the video feed location of the person detected in the video feed. For example, location identifying component 214 can determine the video feed location of the person based on a pixel location of the bounding box (e.g., the center of the bounding box, the edges of the bounding box, etc.) on an image from the video feed.

In an example, if feet of the person are visible in the video feed (e.g., the bounding box includes the feet of the person), location identifying component 214 can determine the video feed location of the person based on projecting a lower part of the bounding box from the video feed (e.g., in an image of the video feed) to the ground plane using homography. If the feet of the person are not visible in the video feed, location identifying component 214 can determine the video feed location of the person by using a height of the camera relative to the ground, the homography, and the assumption that the person is of a certain height (e.g., an average height, such as 5 feet, seven inches). For example, using the image to ground homography, location identifying component 214 can find an intersection of a ray passing through a head of the person and the image plane with the ground. Assuming that the person is of average height, and based on the height of the camera relative to the ground, location identifying component 214 can find a location of the feet on the ground using two similar triangles (e.g., having a same angle of height to ground). An example is shown in FIG. 4.

Figure 4:
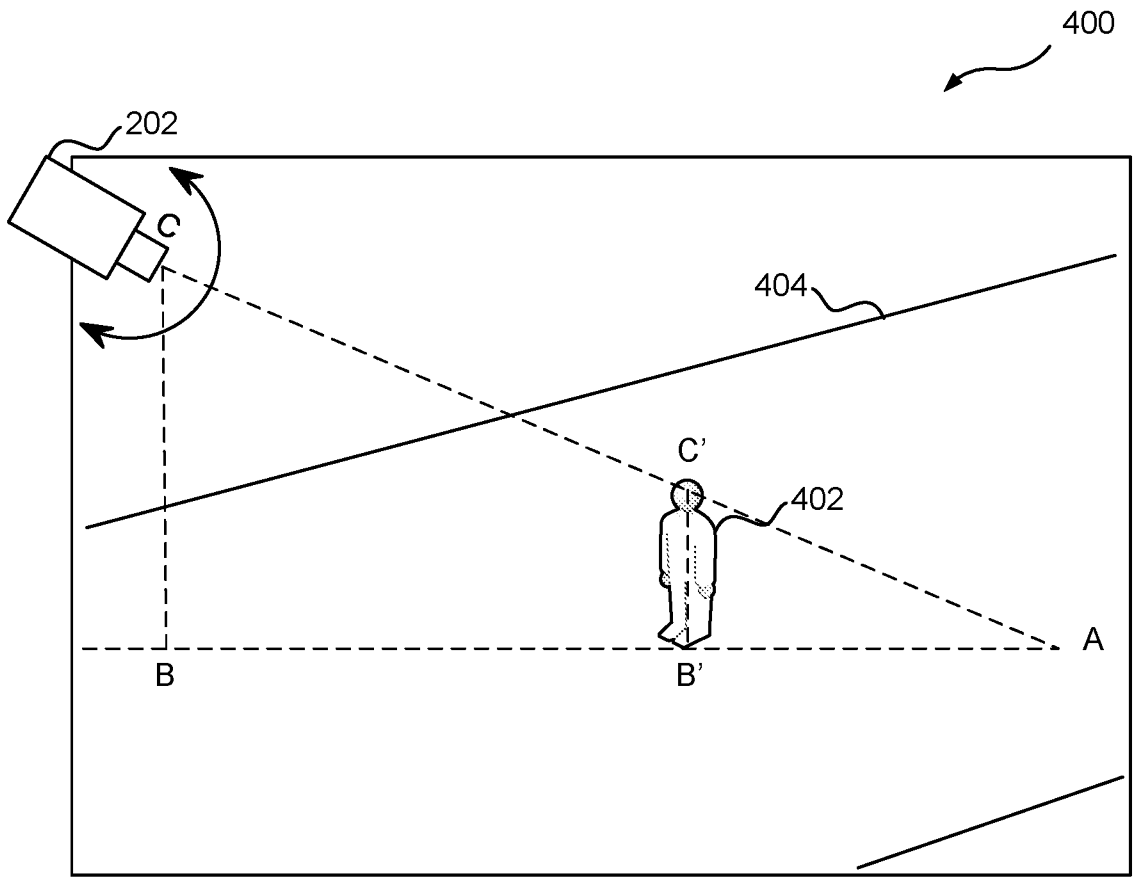
FIG. 4 illustrates an example of an image captured via a camera, according to implementations of the present disclosure.

FIG. 4 illustrates an example of an image 400 captured by a camera 202 of a person 402 and a ground plane 404 (e.g., a floor). In an example, person detecting component 210 can detect the person 402 in the image 400, and/or can draw a bounding box around the person. Where person detecting component 210 detects the feet of the person, location identifying component 214 can identify the location of the person based on projecting the lower part of the bounding box to the ground plane 404 using homography. Where person detecting component 210 does not detect the feet of the person, location identifying component 214 can assume the person is of average height and can accordingly determine the location of the person. For example, using the image to ground homography, location identifying component 214 can find an intersection of the ray passing through a head of the person and the ground plane (e.g., ray CA depicted in FIG. 4). Assuming that the person is of average height (B' C' in FIG. 4), and based on the height of the camera relative to the ground (B C in FIG. 4), location identifying component 214 can find a location of the feet on the ground using two similar triangles (C B A and C' B' A in FIG. 4) having a same angle of height to the ground plane.

In identifying the location of the person at 308, optionally at 310, the video feed location can be translated to the location on the floor plan. In an example, location identifying component 214, e.g., in conjunction with the one or more processors 204, memory/memories 206, etc., can translate the video feed location to the location on the floor plan. For example, the floor plan can be a top-down or birds eye view of the room, and locations or coordinates on the floor plan can be mapped to locations or coordinates on one or more images of the video feed. If enough points are matched between the floor plan and the video feed (e.g., four or more points), location identifying component 214 can compute a floor plan location from a video feed location, and can do so for the detected persons, as described.

At 312, the method 300 may include performing a calibration of video feed locations from the video feed of the camera to locations on the floor plan. In an example, location calibrating component 218, e.g., in conjunction with the one or more processors 204, memory/memories 206, etc., can perform the calibration of video feed locations from the video feed of the camera to locations on the floor plan. For example, various video feed locations (e.g., points, pixels, etc.) in one or more images from the video feed can be mapped to locations (e.g., points, pixels, etc.) on an image of the floor plan. This can be a manual process, as described, where a user interface can allow for selection of the points from the video feed and corresponding points on the floor plan. For example, as shown in FIG. 1, points 1, 2, 3, 4 can be mapped by specifying point 1 on the video feed and then corresponding point 1 on the floor plan, specifying point 2 on the video feed and then corresponding point 2 on the floor plan, etc.

In performing the calibration at 312, optionally at 314, an indication of mapping between multiple points from the video feed and multiple corresponding points on the floor plan can be received from a UI. In an example, location calibrating component 218, e.g., in conjunction with the one or more processors 204, memory/memories 206, etc., can receive the indication of mapping between the multiple points from the video feed and multiple corresponding points on the floor plan. For example, location calibrating component 218 can display the UI on a display device associated with or provided by the occupancy sensing system 200, and can receive, via the UI (e.g., as input from a user) an indication of video feed locations and the corresponding locations on the image of the floor plan. Using this information, for example, location calibrating component 218 can map points from the video feed to the floor plan, such as visible points (e.g., points on the floor, etc.).

At 316, the method 300 may optionally include determining if the location of the person at the point of interest is for a threshold period of time. In an example, status indicating component 216, e.g., in conjunction with the one or more processors 204, memory/memories 206, etc., can determine if the location of the person at the point of interest is for the threshold period of time. If not, the method 300 can continue to 302 where the occupancy sensing component 200 receive the video feed. In one example, the threshold period of time may be different based on the detected height of the person. For example, where the detected height indicates the person is seated, the threshold period of time may be less than if the detected height indicates the person is standing, as a seated person may be more likely occupying the point of interest than a standing person.

If the location of the person of interest is for the threshold period of time at 316 (or otherwise), the method can include, at 318, indicating the point of interest as being occupied. In an example, status indicating component 216, e.g., in conjunction with the one or more processors 204, memory/memories 206, etc., can indicate the point of interest as being occupied. In one example, status indicating component 216 indicating the point of interest as occupied may be based on person detecting component 210 detecting that the person is seated (e.g., based on the detected height being less than a threshold). For example, status indicating component 216 can report the status indication to one or more other systems, such as a hot desking system 222, an automated control system 224, etc., and the one or more other systems can perform actions based on the indicated occupancy status for the point of interest, as described herein. For example, the hot desking system 222 can indicate status for the point of interest on an interface displayed on a display, which can include changing a color of a status indicator for the point of interest (e.g., from green, representing vacant, to red, representing occupied).

In indicating the point of interest as being occupied at 318, optionally at 320, an occupancy metric can be indicated for the room. In an example, status indicating component 216, e.g., in conjunction with the one or more processors 204, memory/memories 206, etc., can indicate the occupancy metric for the room. For example, status indicating component 216 can indicate the occupancy metric a percentage of points of interest that are occupied, an indication that the room is completely full (e.g., all points of interest are occupied), etc. As described, for example, the hot desking system 222 can use this information for representing an occupancy status for the room, automated control system 224 may use this information to control one or more automated components for the room (e.g., HVAC, lighting, etc.), and/or the like.

At 322, the method 300 can optionally include controlling an automated system for the room based on the occupancy metric. In an example, automated control system 224 can control the automated system (e.g., HVAC, lighting, etc.) based on the occupancy metric. For example, where a threshold number of points of interest are occupied (e.g., one or more), automated control system 224 can operate HVAC. In another example, automated control system 224 can operate lights based on location of the points of interest that are occupied (e.g., to only light areas of the room that are being occupied).

In an example, after the point of interest is indicated as being occupied at 318, the method can proceed to 302 to continue receiving the video feed and detecting persons in the video feed. In one example, occupancy sensing device 200, in this regard, can continue to detect persons occupying the points of interest and indicating the points of interest as occupied. When the person moves away from the point of interest, and person detecting component 210 no longer detects a person at the location corresponding to the point of interest (e.g., for a threshold period of time or otherwise), status indicating component 216 can indicate the status of the point of interest as vacant. In an example, occupancy sensing device 200 can send this status indication to the other systems as well. For example, sensing device 200 can send this status indication to hot desking system 222 to facilitate status modification for the point of interest on an interface provided by the hot desking system 222. For example, sensing device 200 can send this status indication to automated control system 224 to facilitate control or automated building components (e.g., HVAC, lighting, etc.) when the point of interest is no longer occupied, when a threshold number of points of interest are no longer occupied, etc.

Figure 5:
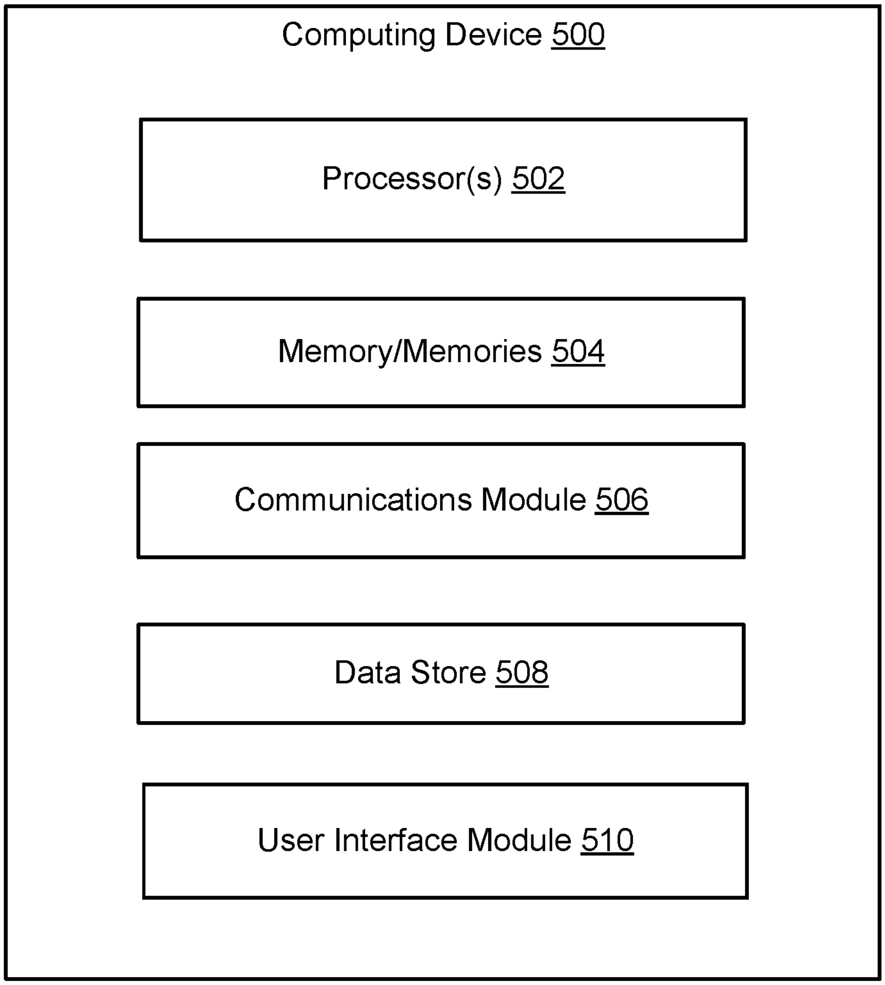
FIG. 5 is a block diagram of examples components of a computer device that may implement one or more of the features of the occupancy sensing device of FIG. 1.

Referring to FIG. 5, a computing device 500 may implement all or a portion of the functionality described in FIGS. 1-3. For example, the computing device 500 may be or may include at least a portion of the control system 120, or any other module or component described herein with reference to FIGS. 1-3. The computing device 500 may include one or more processors 502 which may be configured to execute or implement software, hardware, and/or firmware modules that perform some or all of the functionality described herein with reference to FIGS. 1-3. For example, the processor(s) 502 may be configured to execute or implement software, hardware, and/or firmware modules that perform some or all of the functionality described herein with reference to the control system 120, or any other module or component described herein with reference to FIGS. 1-3.

The processor(s) 502 may be a micro-controller, an application-specific integrated circuit (ASIC), or a field-programmable gate array (FPGA), and/or may include a single or multiple set of processors or multi-core processors. Moreover, the processor(s) 502 may be implemented as an integrated processing system and/or a distributed processing system. The computing device 500 may further include memory/memories 504, such as for storing local versions of applications being executed by the processor(s) 502, related instructions, parameters, etc. The memory/memories 504 may include a type of memory usable by a computer, such as random access memory (RAM), read only memory (ROM), tapes, magnetic discs, optical discs, volatile memory, non-volatile memory, and any combination thereof. Additionally, the processor(s) 502 and the memory/memories 504 may include and execute an operating system executing on the processor(s) 502, one or more applications, display drivers, etc., and/or other modules or components of the computing device 500.

Further, the computing device 500 may include a communications module 506 that provides for establishing and maintaining communications with one or more other devices, parties, entities, etc. utilizing hardware, software, and services. The communications module 506 may carry communications between modules on the computing device 500, as well as between the computing device 500 and external devices, such as devices located across a communications network and/or devices serially or locally connected to the computing device 500. In an aspect, for example, the communications module 506 may include one or more buses, and may further include transmit chain modules and receive chain modules associated with a wireless or wired transmitter and receiver, respectively, operable for interfacing with external devices.

Additionally, the computing device 500 may include a data store 508, which can be any suitable combination of hardware and/or software, that provides for mass storage of information, databases, and programs. For example, the data store 508 may be or may include a data repository for applications and/or related parameters not currently being executed by processor(s) 502. In addition, the data store 508 may be a data repository for an operating system, application, display driver, etc., executing on the processor 502, and/or one or more other modules of the computing device 500.

The computing device 500 may also include a user interface module 510 operable to receive inputs from a user of the computing device 500 and further operable to generate outputs for presentation to the user (e.g., via a display interface to a display device). The user interface module 510 may include one or more input devices, including but not limited to a keyboard, a number pad, a mouse, a touch-sensitive display, a navigation key, a function key, a microphone, a voice recognition module, or any other mechanism capable of receiving an input from a user, or any combination thereof. Further, the user interface module 510 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X. Y, and Z (e.g., to perform Y and Z). Alternatively, a first processor, a second processor, and a third processor may be respectively configured or operable to perform a respective one of actions X. Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

What is claimed is:

1. A method for indicating occupancy of a point of interest in a room, comprising:

receiving a video feed from a camera located in the room;

detecting, using an artificial intelligence (AI) model, a person in the video feed;

identifying a location of the person on a floor plan of the room based on a video feed location of the person detected in the video feed, wherein the point of interest is a seat in the room, and wherein identifying the location of the person is based at least in part on a height of the camera relative to a ground plane and an assumed height of a seated person when seated; and where the location of the person on the floor plan is at the point of interest for at least a threshold period of time, indicating the point of interest as being occupied.

2. The method of claim 1, further comprising performing a calibration of video feed locations from the video feed of the camera to locations on the floor plan based at least in part on multiple points from the video feed indicated as corresponding to multiple corresponding points on the floor plan.

3. The method of claim 2, further comprising receiving, from a user interface, an indication of a mapping between the multiple points from the video feed and the multiple corresponding points on the floor plan.

4. The method of claim 1, wherein indicating the point of interest as being occupied includes displaying, on a user interface, a representation of the floor plan and a visual indication that the point of interest is being occupied.

5. The method of claim 1, further comprising computing, based on indicating multiple points of interest in the room as being occupied, an occupancy metric for the room.

6. The method of claim 5, further comprising controlling an automated system for the room based on the occupancy metric.

7. The method of claim 1, wherein identifying the location of the person includes computing, based on the height of the camera relative to the ground plane and the assumed height of the seated person when seated, a location of the feet of the person on the ground plane.

8. The method of claim 7, further comprising, when the feet of the person are not visible in the video feed, using homography to find an intersection of a ray passing through a head of the person with the ground plane, wherein identifying the location of the person is based on a first triangle associated with the height of the camera and a second triangle associated with the ray, wherein the second triangle is based on the assumed height of the seated person when seated and has a same angle of height to the ground plane as the first triangle.

9. An apparatus, comprising:

one or more memories configured to store instructions; and one or more processors communicatively coupled with the one or more memories, wherein the one or more processors are configured to:

receive a video feed from a camera located in a room;

detect, using an artificial intelligence (AI) model, a person in the video feed;

identify a location of the person on a floor plan of the room based on a video feed location of the person detected in the video feed, wherein a point of interest is a seat in the room, and wherein identifying the location of the person is based at least in part on a height of the camera relative to a ground plane and an assumed height of a seated person when seated; and where the location of the person on the floor plan is at the point of interest for at least a threshold period of time, indicate the point of interest as being occupied.

10. The apparatus of claim 9, wherein the one or more processors are configured to perform a calibration of video feed locations from the video feed of the camera to locations on the floor plan based at least in part on multiple points from the video feed indicated as corresponding to multiple corresponding points on the floor plan.

11. The apparatus of claim 10, wherein the one or more processors are configured to receive, from a user interface, an indication of a mapping between the multiple points from the video feed and the multiple corresponding points on the floor plan.

12. The apparatus of claim 9, wherein the one or more processors are configured to indicate the point of interest as being occupied at least in part by displaying, on a user interface, a representation of the floor plan and a visual indication that the point of interest is being occupied.

13. The apparatus of claim 9, wherein the one or more processors are configured to compute, based on indicating multiple points of interest in the room as being occupied, an occupancy metric for the room.

14. The apparatus of claim 13, wherein the one or more processors are configured to control an automated system for the room based on the occupancy metric.

15. One or more non-transitory computer-readable media storing instructions, executable by one or more processors, for indicating occupancy of a point of interest in a room, the instructions comprising instructions for:

receiving a video feed from a camera located in the room;

detecting, using an artificial intelligence (AI) model, a person in the video feed;

identifying a location of the person on a floor plan of the room based on a video feed location of the person detected in the video feed, wherein the point of interest is a seat in the room, and wherein identifying the location of the person is based at least in part on a height of the camera relative to a ground plane and an assumed height of a seated person when seated; and where the location of the person on the floor plan is at the point of interest for at least a threshold period of time, indicating the point of interest as being occupied.

16. The one or more non-transitory computer-readable media of claim 15, further comprising instructions for performing a calibration of video feed locations from the video feed of the camera to locations on the floor plan based at least in part on multiple points from the video feed indicated as corresponding to multiple corresponding points on the floor plan.

17. The one or more non-transitory computer-readable media of claim 16, further comprising instructions for receiving, from a user interface, an indication of a mapping between the multiple points from the video feed and the multiple corresponding points on the floor plan.

18. The one or more non-transitory computer-readable media of claim 15, wherein the instructions for indicating the point of interest as being occupied include instructions for displaying, on a user interface, a representation of the floor plan and a visual indication that the point of interest is being occupied.

19. The one or more non-transitory computer-readable media of claim 15, further comprising instructions for computing, based on indicating multiple points of interest in the room as being occupied, an occupancy metric for the room.

20. The one or more non-transitory computer-readable media of claim 19, further comprising instructions for controlling an automated system for the room based on the occupancy metric.

* * * * *